US011379957B1

(12) United States Patent
Chandrasekhar et al.

(10) Patent No.: US 11,379,957 B1
(45) Date of Patent: Jul. 5, 2022

(54) HEAD WEARABLE DISPLAY DEVICE CALIBRATED FOR DISTORTION CORRECTION USING INTER-PUPILLARY DISTANCE

(71) Applicant: QUALCOMM Incorporated, San Diego, CA (US)

(72) Inventors: Ramesh Chandrasekhar, Oceanside, CA (US); Abhijeet Bisain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/183,241

(22) Filed: Feb. 23, 2021

(51) Int. Cl.
*G06T 5/00* (2006.01)
*H04N 13/239* (2018.01)
*G06V 40/16* (2022.01)

(52) U.S. Cl.
CPC .......... *G06T 5/006* (2013.01); *G06V 40/165* (2022.01); *H04N 13/239* (2018.05); *G06T 2207/10012* (2013.01); *G06T 2207/30201* (2013.01)

(58) Field of Classification Search
CPC ............... G06V 40/165; H04N 13/239; G06T 2207/10012; G06T 2207/30201; G06T 5/006
USPC ........................................................ 348/47
See application file for complete search history.

(56) References Cited

U.S. PATENT DOCUMENTS

| 10,852,817 | B1* | 12/2020 | Ouderkirk | G06V 40/18 |
|---|---|---|---|---|
| 11,039,651 | B1* | 6/2021 | Bosworth | H04S 7/303 |
| 2019/0333480 | A1 | 10/2019 | Lang | |
| 2020/0250872 | A1* | 8/2020 | Kaehler | G06V 20/20 |
| 2020/0349907 | A1* | 11/2020 | Neustein | H04N 13/383 |
| 2021/0110560 | A1* | 4/2021 | Knorr | G06T 7/277 |
| 2021/0160468 | A1* | 5/2021 | Peuhkurinen | G02B 27/0172 |

FOREIGN PATENT DOCUMENTS

WO WO 2019/135169 * 7/2019 ........... H04N 13/327

OTHER PUBLICATIONS

Grubert et al., A Survey of Calibration Methods for Optical See-Through Head-Mounted Displays, Sep. 2017, 1709304299 v1 (Year: 2017).*

(Continued)

*Primary Examiner* — Marnie A Matt
(74) *Attorney, Agent, or Firm* — Holland & Hart LLP

(57) ABSTRACT

Methods, systems, and devices for head wearable display devices are described. A device may capture a set of images over a set of orientations using a set of cameras positioned on an outward facing surface of the device. The set of images include a first subset of images captured by a first camera and a second subset of images captured by a second camera. The device may detect a set of facial features in each of the first subset of images and the second subset of images, and measure a set of inter-pupillary distances over the set of orientations based on the set of facial features in each of the first and second subset of images. The device may determine an inter-pupillary distance parameter based on aggregating the set of inter-pupillary distances over the set of orientations. The device may calibrate based on the inter-pupillary distance parameter.

19 Claims, 9 Drawing Sheets

(56) References Cited

OTHER PUBLICATIONS

H. Jun and G. Kim, "A calibration method for optical see-through head-mounted displays with a depth camera," 2016 IEEE Virtual Reality (VR), 2016, pp. 103-111, doi: 10.1109/VR.2016.7504693 (Year: 2016).*

L. Qian, A. Winkler, B. Fuerst, P. Kazanzides and N. Navab, "Modeling Physical Structure as Additional Constraints for Stereoscopic Optical See-Through Head-Mounted Display Calibration," 2016 IEEE (ISMAR-Adjunct), 2016, pp. 154-155, doi: 10.1109/IS (Year: 2016).*

* cited by examiner

HEAD WEARABLE DISPLAY DEVICE CALIBRATED FOR DISTORTION CORRECTION USING INTER-PUPILLARY DISTANCE

BACKGROUND

The following relates to head wearable display devices, including head wearable display devices (also referred to as head-mounted displays).

Systems are widely deployed to provide various types of content such as voice, video, packet data, messaging, broadcast, and so on. These systems may be capable of processing, storage, generation, manipulation and rendition of information. An example of a system includes a virtual reality system, which may include rendering hardware (e.g., a personal computer) and display hardware (e.g., a head-mounted display), which support processing and providing a stereoscopic multi-dimensional visualization using digital or virtual image information. Some examples of virtual reality systems may support a fully immersive virtual reality experience, a non-immersive virtual reality experience, or a collaborative virtual reality experience. Other examples of systems include entertainment systems, productivity systems, navigation systems, safety and security systems, and health and fitness systems. The quality of these different experiences may be affected by an inter-pupillary distance, which may create distortion and lead to degraded visual quality.

SUMMARY

The described techniques relate to improved methods, systems, devices, and apparatuses that support devices, such as handled devices, wearable devices, head wearable devices, etc. Generally, the described techniques provide for correcting inter-pupillary distance-based lens distortion using stereo cameras of a device, such as an augmented reality head wearable device. The described techniques may use one or multiple external facing cameras to determine an inter-pupillary distance of a user wearing the head wearable display device. The head wearable display device may be configured to trigger an inter-pupillary distance computation state or may be triggered via another device (e.g., a smartphone), thereby switching the tracking cameras to a streaming mode. The head wearable display device may detect the eyes of the user in the tracking camera frames, determine the inter-pupillary distance by using the stereo images captured from the head wearable display device, and refine an inter-pupillary distance estimate over multiple frames captured from multiple orientations (e.g., angles). Based on the inter-pupillary distance, the head wearable display device may determine the best lens distortion correction parameters for the inter-pupillary distance, to improve visual quality of virtual objects rendered via the head wearable display device.

A method for distortion correction at a device is described. The method may include capturing a set of images over a set of orientations using a set of cameras of the device, the set of images including a first subset of images captured by a first camera of the set of cameras and a second subset of images captured by a second camera of the set of cameras, detecting a set of facial features in each of the first subset of images and the second subset of images, measuring a set of inter-pupillary distances over the set of orientations based on the set of facial features in each of the first subset of images and the second subset of images, determining an inter-pupillary distance parameter for the device based on aggregating the set of inter-pupillary distances over the set of orientations, and calibrating the device based on the inter-pupillary distance parameter.

An apparatus for distortion correction is described. The apparatus may include a processor, memory coupled with the processor, and instructions stored in the memory. The instructions may be executable by the processor to cause the apparatus to capture a set of images over a set of orientations using a set of cameras of the apparatus, the set of images including a first subset of images captured by a first camera of the set of cameras and a second subset of images captured by a second camera of the set of cameras, detect a set of facial features in each of the first subset of images and the second subset of images, measure a set of inter-pupillary distances over the set of orientations based on the set of facial features in each of the first subset of images and the second subset of images, determine an inter-pupillary distance parameter for the apparatus based on aggregating the set of inter-pupillary distances over the set of orientations, and calibrate the apparatus based on the inter-pupillary distance parameter.

Another apparatus for distortion correction is described. The apparatus may include means for capturing a set of images over a set of orientations using a set of cameras of the apparatus, the set of images including a first subset of images captured by a first camera of the set of cameras and a second subset of images captured by a second camera of the set of cameras, means for detecting a set of facial features in each of the first subset of images and the second subset of images, means for measuring a set of inter-pupillary distances over the set of orientations based on the set of facial features in each of the first subset of images and the second subset of images, means for determining an inter-pupillary distance parameter for the apparatus based on aggregating the set of inter-pupillary distances over the set of orientations, and means for calibrating the apparatus based on the inter-pupillary distance parameter.

A non-transitory computer-readable medium storing code for distortion correction at a device is described. The code may include instructions executable by a processor to capture a set of images over a set of orientations using a set of cameras of the device, the set of images including a first subset of images captured by a first camera of the set of cameras and a second subset of images captured by a second camera of the set of cameras, detect a set of facial features in each of the first subset of images and the second subset of images, measure a set of inter-pupillary distances over the set of orientations based on the set of facial features in each of the first subset of images and the second subset of images, determine an inter-pupillary distance parameter for the device based on aggregating the set of inter-pupillary distances over the set of orientations, and calibrate the device based on the inter-pupillary distance parameter.

Some examples of the method, apparatuses, and non-transitory computer-readable medium described herein may further include operations, features, means, or instructions for determining a condition to perform an inter-pupillary measurement at the device and enabling an inter-pupillary measurement state for the device based on the condition. In some examples of the method, apparatuses, and non-transitory computer-readable medium described herein, measuring the set of inter-pupillary distances may be based on the enabling of the inter-pupillary measurement state.

Some examples of the method, apparatuses, and non-transitory computer-readable medium described herein may further include operations, features, means, or instructions for receiving a request from the device. In some examples of the method, apparatuses, and non-transitory computer-readable medium described herein, determining the condition to perform the inter-pupillary measurement at the device may be based on the receiving of the request from the device.

Some examples of the method, apparatuses, and non-transitory computer-readable medium described herein may further include operations, features, means, or instructions for detecting one or more signals based on one or more sensors of the device, and analyzing the one or more signals using one or more learning models to identify the request to perform the inter-pupillary measurement. In some examples of the method, apparatuses, and non-transitory computer-readable medium described herein, determining the condition to perform the inter-pupillary measurement at the device may be based on the analyzing of the one or more signals using the one or more learning models to identify the request to perform the inter-pupillary measurement.

In some examples of the method, apparatuses, and non-transitory computer-readable medium described herein, the one or more signals include one or more audio signals associated with a user of the device, or one or more gestures associated with the user of the device, or both. In some examples of the method, apparatuses, and non-transitory computer-readable medium described herein, the one or more learning models include an audio recognition model or a gesture recognition model, or both.

Some examples of the method, apparatuses, and non-transitory computer-readable medium described herein may further include operations, features, means, or instructions for determining a distortion correction parameter based on measuring the set of inter-pupillary distances. In some examples of the method, apparatuses, and non-transitory computer-readable medium described herein, the calibrating of the device may be based on the distortion correction parameter.

In some examples of the method, apparatuses, and non-transitory computer-readable medium described herein, the set of images further include a third subset of images captured by the first camera and a fourth subset of images captured by the second camera.

Some examples of the method, apparatuses, and non-transitory computer-readable medium described herein may further include operations, features, means, or instructions for determining an absence of the set of facial features in each of the third subset of images and the fourth subset of images and refraining from remeasuring of the set of inter-pupillary distances based on the determining of the absence of the set of facial features in each of the third subset of images and the fourth subset of images.

Some examples of the method, apparatuses, and non-transitory computer-readable medium described herein may further include operations, features, means, or instructions for determining an absence of the set of facial features in each of the third subset of images and the fourth subset of images and refraining from redetermining the inter-pupillary distance parameter based on the determining of the absence of the set of facial features in each of the third subset of images and the fourth subset of images.

Some examples of the method, apparatuses, and non-transitory computer-readable medium described herein may further include operations, features, means, or instructions for determining of an absence of the set of facial features in each of the third subset of images and the fourth subset of images and ignoring the third subset of images or the fourth subset of images, or both, based on the determining of the absence of the set of facial features in each of the third subset of images and the fourth subset of images.

In some examples of the method, apparatuses, and non-transitory computer-readable medium described herein, the set of facial features including a set of irises.

Some examples of the method, apparatuses, and non-transitory computer-readable medium described herein may further include operations, features, means, or instructions for determining a stereo match between a first iris of the set of irises and a second iris of the set of irises based on the detecting of the set of facial features. In some examples of the method, apparatuses, and non-transitory computer-readable medium described herein, the stereo match includes a sub-pixel stereo match.

Some examples of the method, apparatuses, and non-transitory computer-readable medium described herein may further include operations, features, means, or instructions for determining a stereo baseline associated with the set of irises based on the detecting of the set of facial features. In some examples of the method, apparatuses, and non-transitory computer-readable medium described herein, determining of the stereo match may be based on the stereo baseline.

In some examples of the method, apparatuses, and non-transitory computer-readable medium described herein, the set of cameras may be each positioned on an outward facing surface of the device.

In some examples of the method, apparatuses, and non-transitory computer-readable medium described herein, the set of cameras includes a set of eye tracking cameras, a set of red-green-blue (RGB) cameras, a set of infrared (IR) cameras, or a set of time-of-flight (ToF) sensors, or a combination thereof.

Some examples of the method, apparatuses, and non-transitory computer-readable medium described herein may further include operations, features, means, or instructions for calibrating the device may be based on one or more user profiles.

DETAILED DESCRIPTION

Head wearable display devices have increasingly become an integral part of the way in which users interact with various applications, such as augmented reality applications. These devices may be configured with a display interface, a camera, and other hardware or software components to support the various applications. Some head wearable display devices may experience lens distortion and thereby may be preconfigured to correct the lens distortion by presuming certain fixed inter-pupillary distance for the users. However, fixed inter-pupillary distance-based lens distortion corrections may cause visual artifacts for the users. Some head wearable display devices may, alternatively, be configured to compute inter-pupillary distance using eye-tracking cameras. However, use of eye-tracking cameras may be resource extensive and cause added power and thermal dissipation for the head wearable display devices. Therefore it may be desirable to provide improvements for correcting inter-pupillary distance-based lens distortion.

Various aspects of the present disclosure relate to techniques for correcting inter-pupillary distance-based lens distortion using stereo cameras of a head wearable display device, such as an augment reality head wearable display device. The described techniques may use one or more external facing cameras (e.g., outward facing) to determine an inter-pupillary distance of a user wearing the head wearable display device. The head wearable display device may be configured to trigger an inter-pupillary distance computation state or may be triggered via another device in electronic communication with the head wearable display device, thereby switching the tracking cameras to a streaming mode. The head wearable display device may detect the eyes of the user in the tracking camera frames, determine the inter-pupillary distance by using the stereo images captured from the head wearable display device, and refine an inter-pupillary distance estimate over multiple frames captured from multiple orientations. After the inter-pupillary distance is determined, the head wearable display device may determine the best lens distortion correction parameters for the inter-pupillary distance, to improve visual quality of virtual objects rendered via the head wearable display device.

Aspects of the disclosure are initially described in the context of a system. Aspects of the disclosure are further illustrated by and described with reference to apparatus diagrams, system diagrams, and flowcharts that relate to head wearable display devices.

Figure 1:
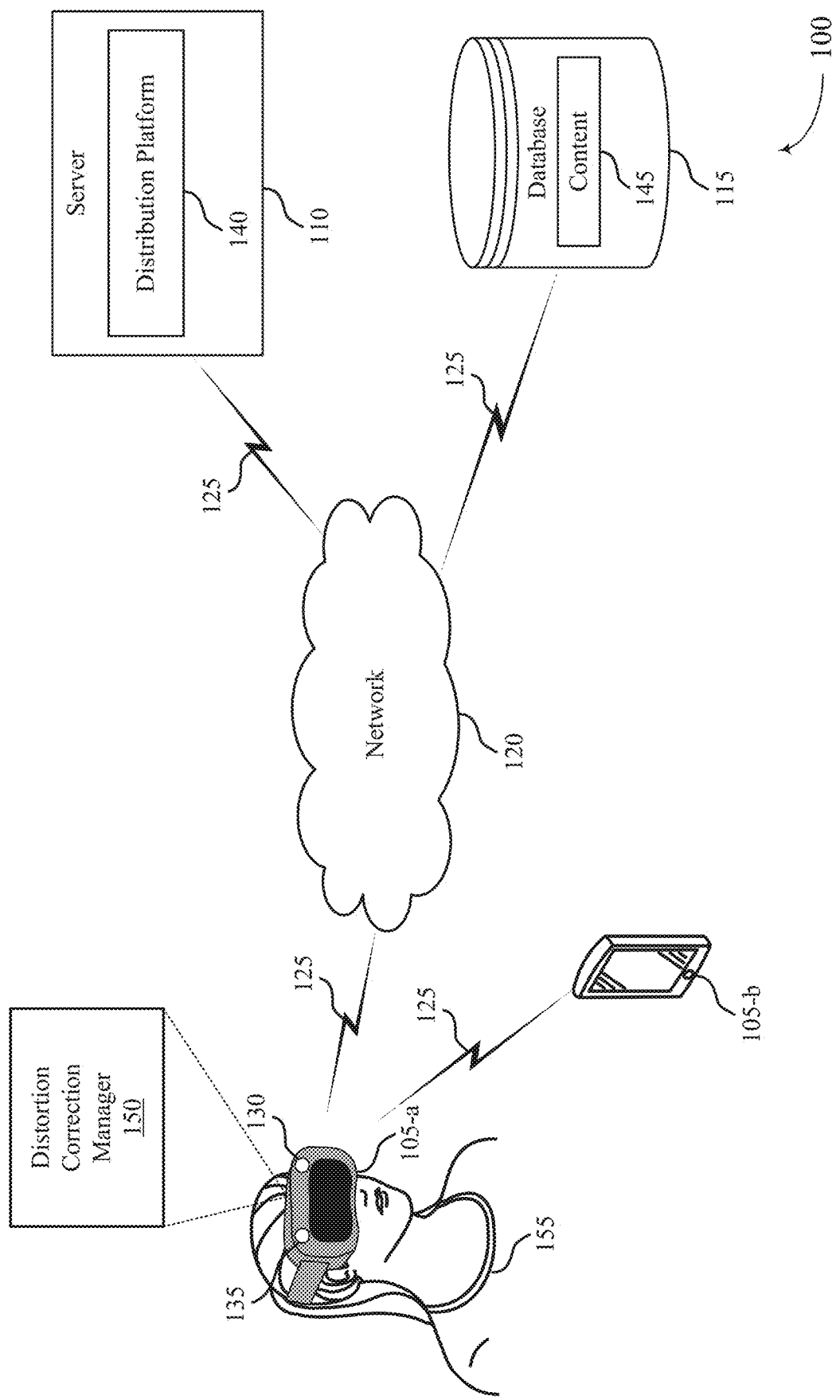
FIG. 1 illustrates an example of a system that supports head wearable display devices in accordance with aspects of the present disclosure.

FIG. 1 illustrates a system 100 for a device that supports head wearable display devices in accordance with aspects of the present disclosure. The system 100 may include devices 105, a server 110, and a database 115. Although, the system 100 illustrates two devices 105, a single server 110, a single database 115, and a single network 120, the present disclosure applies to any system architecture having one or more devices 105, servers 110, databases 115, and networks 120. The devices 105, the server 110, and the database 115 may communicate with each other and exchange information that supports head wearable display devices, such as packets, data, or control information, via network 120 using communications links 125. In some cases, a portion or all of the techniques described herein supporting distortion correction may be performed by the devices 105 or the server 110, or both.

A device 105 may be a head wearable display device or a handheld device (e.g., a smartphone with a camera). For example, a device 105-a may be a pair of augmented reality glasses, a head mounted display device, and the like. As a head wearable display device, the device 105-a may be worn by a user 155. In some examples, the device 105-a may be configured with one or more sensors to sense a position of the user 155 and/or an environment surrounding the device to generate information when the user 155 is wearing the device 105-a. The information may include movement information, orientation information, angle information, etc. regarding the device 105-a. In some cases, the device 105-a may be configured with a microphone for capturing audio and one or more speakers for broadcasting audio. The device 105-a may also be configured with a set of lenses and a display screen for the user 155 to view and be part of a virtual reality experience.

The device 105-a may be configured to perform lens distortion correction based on inter-pupillary distance associated with the user 155. An inter-pupillary distance for the user 155 may vary between 50 mm and 75 mm. In some cases, the device 105-a may be configured to support static inter-pupillary distance-based lens distortion correction. However, static inter-pupillary distance-based lens distortion correction may cause visual artifacts for the user 155 wearing the device 105-a. In some examples, if the inter-pupillary distance associated with the user 155 is known (e.g., an augmented reality glasses user is known), the device 105-a may be capable of configuring lens distortion correction parameters for that inter-pupillary distance. As a result, the user 155 may experience improved visual quality of virtual objects rendered on the device 105-a (e.g., augmented reality glasses).

The device 105-a may determine an inter-pupillary distance using a set of cameras. As a head wearable display device, the device 105-a may include an eyeward side that faces the user's 155 eyes when the device 105-a is worn and an outward side that is opposite the eyeward side. The device 105-a may be configured to use a set of external facing (outward) cameras, such as a camera 130 and a camera 135. The camera 130 or the camera 135, or both, may be eye tracking cameras (such as, 6 degrees of freedom head tracking cameras), a set of red-green-blue (RGB) cameras, a set of infrared (IR) cameras, or a set of time-of-flight (ToF) sensors, or a combination thereof. The camera 130 and the camera 135 may be configured (e.g., operably coupled) to an anterior surface on the outward side of the device 105-a. For example, the camera 130 and the camera 135 may be part of the body of the device 105-a that faces outward. In some examples, the device 105-a may be a pair of augmented reality glasses and the set of cameras may be positioned on an outward side of the pair of augmented reality glasses. The camera 130 may be positioned on a right-side of the device 105-a and the camera 135 may be positioned on a left-side of the device 105-a of an anterior surface on the outward side of the device 105-a. Although, the device 105-a illustrates two cameras, the present disclosure applies to any device architecture having two or more cameras.

The devices 105 may be configured to communicate wirelessly or directly (e.g., through a direct interface) with each other. For example, a device 105-b (e.g., a smartphone) and the device 105-a (e.g., head wearable display device) may be able to communicate directly with each other (e.g., using a peer-to-peer (P2P) or device-to-device (D2D) protocol). In some examples, the device 105-a (e.g., augmented reality glasses) may determine a condition to perform an inter-pupillary measurement at the device 105-a. The device 105-a (e.g., head wearable display device) may enable an inter-pupillary measurement state for the device 105-a based on the condition. For example, the device 105-a (e.g., augmented reality glasses) may trigger the inter-pupillary measurement state or the device 105-b (e.g., companion-smartphone) may trigger the inter-pupillary measurement state. In some examples, the device 105-a may detect one or more signals based on one or more sensors of the device 105-a, and analyze the one or more signals using one or more learning models to identify the request to perform the inter-pupillary measurement. The one or more signals may include one or more audio signals associated with the user 155 of the device 105-a, or one or more gestures associated with the user 155 of the device 105-a, or both. The one or more learning models may be an audio recognition model or a gesture recognition model, or both.

The device 105-a may enable and switch the camera 130 and the camera 135 to a streaming mode. In the streaming mode, the user 155 may hold the device 105-a (e.g., augmented reality glasses) in their hands and position the device 105-a so that the device 105-a would face the user 155. While holding the device 105-a (e.g., augmented reality glasses) at a distance (e.g., an arm's length) away from the user 155 and facing the user 155, the device 105-a may perform a calibration procedure. The device 105-a may perform the calibration procedure based on the distance satisfying a threshold distance away from the user's 155 face.

As part of the calibration procedure, the device 105-a may capture a set of images over a set of orientations using the set of cameras of the device 105-a. For example, the device 105-a may capture a set of images over a set of direction and angles using the set of cameras of the device 105-a. The set of images may include a first subset of images captured by the camera 130 and a second subset of images captured by the camera 135. In some examples, the images may be stereo images. The device 105-a may then detect a set of facial features associated with the user 155 in each of the first subset of images and the second subset of images. For example, the device 105-a may detect a set of irises (e.g., the eyes of the user 155) in the captured images (e.g., camera frames) from both the camera 130 and the camera 135.

The device 105-a may measure a set of inter-pupillary distances associated with the eyes of the user 155 over the set of orientations in each of the first subset of images and the second subset of images. That is, the device 105-a may compute the inter-pupillary distances by using stereo images captured from the device 105-a. In some examples, the device 105-a may be configured to use epipolar geometry constraints to determine a multi-dimensional location of each eye of the user 155 and compute the distance between the two eyes (e.g., an inter-pupillary distance). The device 105-a may use multiple such measurements to improve the accuracy. In some cases, the camera intrinsic and extrinsic parameters of the camera 130 or the camera 135, or both, may be preconfigured for the device 105-a.

The device 105-a may determine an inter-pupillary distance parameter for the device 105-a based on aggregating the set of inter-pupillary distances over the set of orientations. For example, the device 105-a may refine inter-pupillary distance estimates over multiple frames taken from multiple angles as described herein. Once the inter-pupillary distance is computed, the device 105-a can forward the inter-pupillary distance to a display pipeline of the device 105-a to enable the distortion corrections for the device 105-a geometry in relation to the user's 155 facial geometry. Although the above operations are described with reference to a head wearable display device, such as the device 105-a, the above operations may be also performed by the device 105-b (e.g., a smartphone). That is, instead of using the cameras from the device 105-a, the system 100 may support using one or more cameras of the device 105-b (e.g., a smartphone camera) to achieve the distortion correction.

A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands.

The device 105 may include a distortion correction manager 150 that may support a method for performing one or more of the functions described herein. In some cases, the device 105 may receive (e.g., download, stream, broadcast) from the server 110, database 115 or another device 105, or transmit (e.g., upload) data to the server 110, the database 115, or to another device 105 via communications links 125. The distortion correction manager 150 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the distortion correction manager 150 may process data (e.g., image data, video data, audio data) from and/or write data to a local memory of the device 105 or to the database 115.

The distortion correction manager 150 may also be configured to provide enhancements, restoration, analysis, compression, streaming, and synthesis, among other functionality. For example, the distortion correction manager 150 may perform white balancing, cropping, scaling (e.g., compression), adjusting a resolution, stitching, color processing, filtering, spatial filtering, artifact removal, frame rate adjustments, encoding, decoding, and filtering. By further example, the distortion correction manager 150 may process data to support distortion correction for head wearable display devices, according to the techniques described herein.

The server 110 may be a data server, a cloud server, a server associated with a subscription provider, proxy server, web server, application server, communications server, home server, mobile server, or any combination thereof. The server 110 may in some cases include a distribution platform 140. The distribution platform 140 may allow the devices 105 to discover, browse, share, and download data via network 120 using communications links 125, and therefore provide a digital distribution of the data from the distribution platform 140. As such, a digital distribution may be a form of delivering media content such as audio, video, images, without the use of physical media but over online delivery mediums, such as the Internet. For example, the devices 105 may upload or download applications for streaming, downloading, uploading, processing, enhancing, etc. images, audio, video. The server 110 may also transmit to the devices 105 a variety of information, such as instructions or commands to download applications on the device 105.

The database 115 may store a variety of information, such as instructions or commands. For example, the database 115 may store content 145. The device 105 may retrieve the stored content 145 from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the system 100 may include uplink transmissions from the device 105 to the server 110 and the database 115, and/or downlink transmissions, from the server 110 and the database 115 to the device 105. The communication links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in head wearable display devices. Furthermore, the techniques described herein may provide benefits and enhancements to the operation of the devices 105. For example, by providing an accurate measurement of the inter-pupillary distance without requiring expensive eye tracking cameras to be installed on the device 105, the operational characteristics, such as power consumption, processor utilization (e.g., DSP. CPU. GPU, ISP processing utilization), and memory usage of the devices 105 may be reduced.

Figure 2:
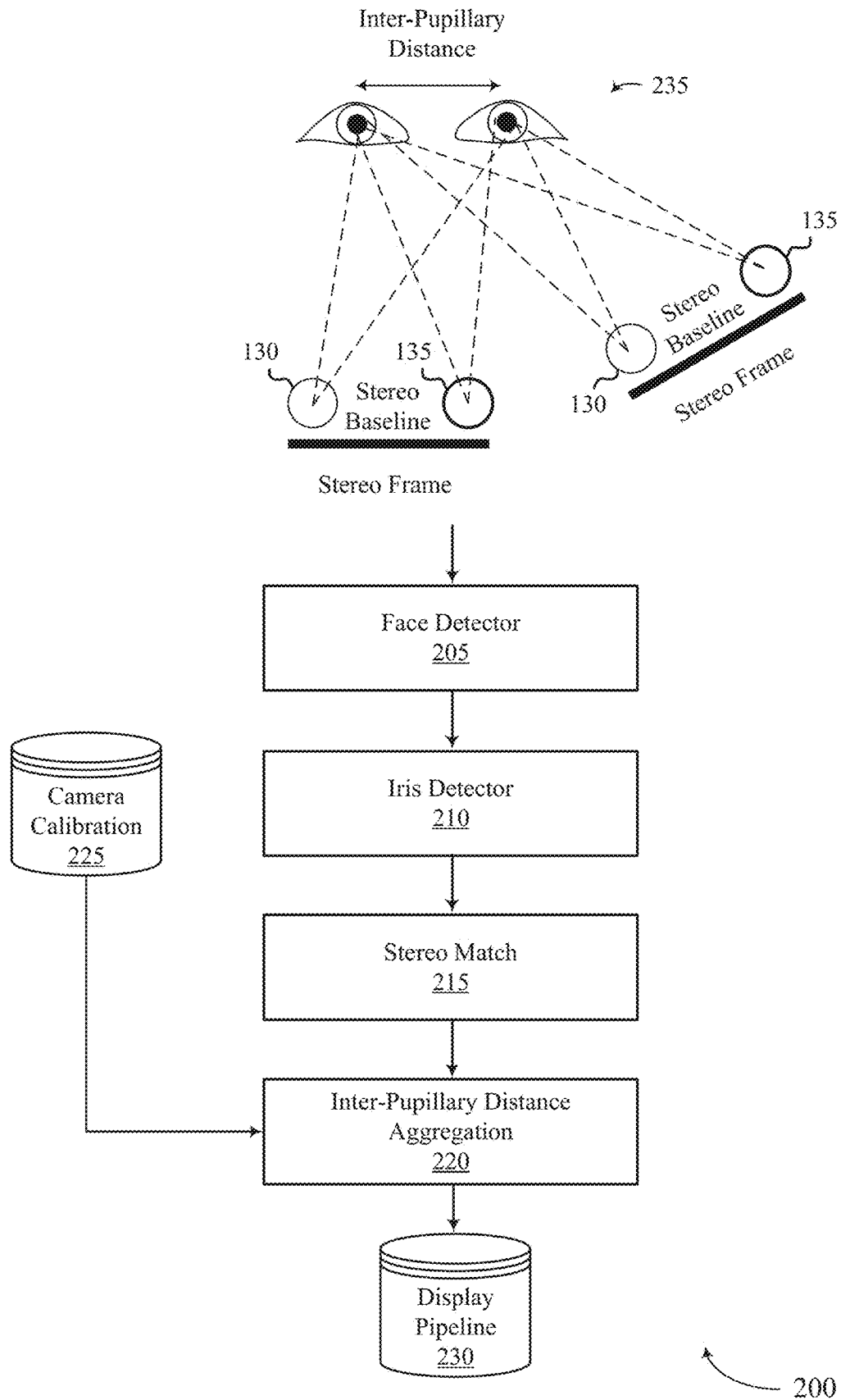
FIG. 2 illustrates an example of a method that supports head wearable display devices in accordance with aspects of the present disclosure.

FIG. 2 illustrates an example of a method 200 that supports head wearable display devices in accordance with aspects of the present disclosure. The operations of the method 200 may be implemented by a device 105 or its components as described herein. For example, the operations of the method 200 may be performed by a device as described with reference to FIG. 1. In some examples, a device 105 may execute a set of instructions to control the functional elements of the device 105 to perform the described functions. Additionally or alternatively, the device 105 may perform aspects of the described functions using special-purpose hardware.

The device 105 may capture a set of images (e.g., stereo frames) over a set of orientations using a set of cameras (e.g., the camera 130 and the camera 135) of the device 105. The camera 130 and the camera 135 may be external facing (outward) cameras. In the example the device 105 is a pair of augmented reality glasses, the camera 130 and the camera 135 may be positioned on an exterior surface of the augmented reality glasses. That is, the camera 130 and the camera 135 may be positioned on an outward side of the augmented reality glasses that is opposite of an eyeward side of the augmented reality glasses.

The set of images may include a first image captured by the camera 130 and a second image captured by the camera 135. As shown in FIG. 2, the device 105 may capture the set of images over a set of angles using the set of cameras (e.g., the camera 130 and the camera 135) of the device 105. For example, the first image captured by the camera 130 may be at a first angle and the second image captured by the camera 135 may also be at the first angle. The device 105 may then capture a third image using the camera 130 and a fourth image using the camera 135. The third image captured by the camera 130 and the fourth image captured by the camera 135 may be at a second angle different from the first angle.

The one or more images (e.g., camera frames) may be forwarded as input the face detector 205. The face detector 205 may detect a set of facial features in the set of images. In some examples, the face detector 205 may detect a set of facial features (e.g., a set of iris, among other facial features) in each of the first image and the second image. In some other examples, the face detector 205 may determine an absence of the set of facial features in each of the third image and the fourth image. The face detector 205 may output keypoints around the eyes 235 of a user. Keypoints around the eye may include a left eye center, a right eye center, a left eye inner corner, a left eye outer corner, a right eye inner corner, or a right eye outer corner, or any combination thereof. If there is no face detected in both images (e.g., frames), the rest of the method 200 terminates (e.g., is skipped by the device 105).

The output of the face detector 205 may be forwarded as input to the iris detector 210 which detects the iris's in each image (e.g., frame). The stereo match 215 matches the iris's detected in, for example, a left image with those on the right image to obtain sub-pixel accurate stereo match. For example, the device 105-a may determine a stereo match between a first iris and a second iris based on the detecting of the set of facial features. The stereo match may include a sub-pixel stereo match. In some examples, the device 105-a may determine a stereo baseline based on the detecting of the set of facial features. In some examples, the device 105 may determine the stereo match based on the stereo baseline.

The inter-pupillary distance aggregation 220 may compute the inter-pupillary distance from current stereo match results and aggregates the information over several iterations (e.g., seconds) to produce an accurate inter-pupillary distance estimate. In some examples, the inter-pupillary distance aggregation 220 may compute the inter-pupillary distance based on information (e.g., extrinsic and intrinsic camera parameters) provided by the camera calibration 225. The inter-pupillary distance aggregation 220 may forward the inter-pupillary distance to a display pipeline 230 of the device 105 to enable the distortion corrections for the device 105 geometry in relation to the user's facial geometry.

Figure 3:
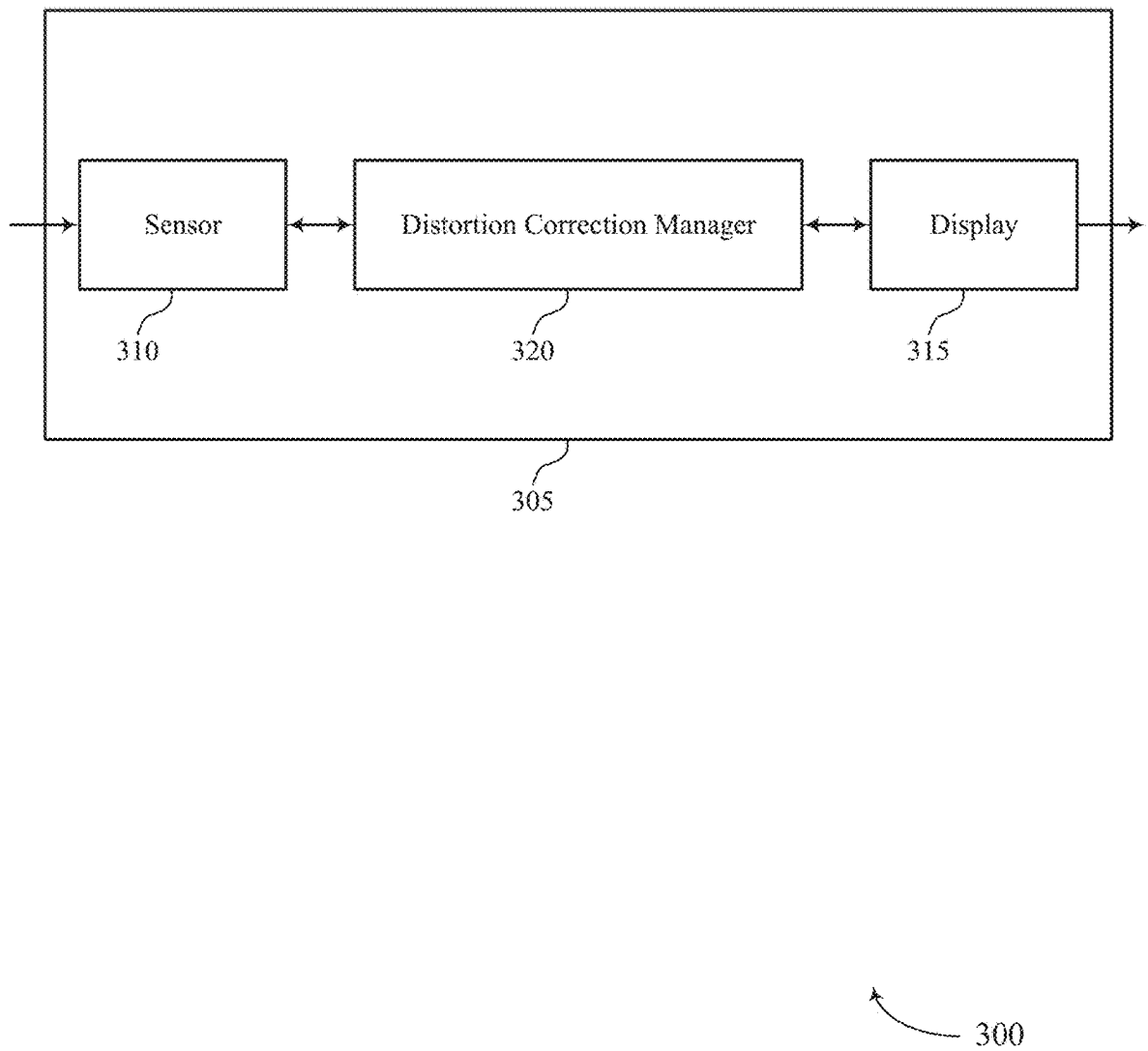
FIGS. 3 and 4 show block diagrams of devices that support head wearable display devices in accordance with aspects of the present disclosure.

FIG. 3 shows a block diagram 300 of a device 305 that supports head wearable display devices in accordance with aspects of the present disclosure. The device 305 may be an example of aspects of a head wearable display device as described herein. The device 305 may include a sensor 310, a display 315, and a distortion correction manager 320. The device 305 may also include a processor. Each of these components may be in communication with one another (e.g., via one or more buses).

The one or more sensors 310 (e.g., image sensors, cameras, etc.) may receive information (e.g., light, for example, visible light and/or invisible light), which may be passed on to other components of the device 305. In some cases, the sensors 310 may be an example of aspects of the I/O controller 610 described with reference to FIG. 6. A sensor 310 may utilize one or more photosensitive elements that have a sensitivity to a spectrum of electromagnetic radiation to receive information (e.g., a sensor 310 may be configured or tuned to receive a pixel intensity value, red green blue (RGB) values, infrared (IR) light values, near-IR light values, ultraviolet (UV) light values of a pixel, etc.). The information may then be passed on to other components of the device 305.

The display 315 may display content generated by other components of the device. The display 315 may be an example of display 635 as described with reference to FIG. 6. In some examples, the display 635 may be connected with a display buffer which stores rendered data until an image is ready to be displayed (e.g., as described with reference to FIG. 6). The display 315 may illuminate according to signals or information generated by other components of the device 305. For example, the display 315 may receive display information (e.g., pixel mappings, display adjustments) from sensor 310, and may illuminate accordingly. The display 315 may represent a unit capable of displaying video, images, text or any other type of data for consumption by a viewer.

The display 315 may include a liquid-crystal display (LCD), a light emitting diode (LED) display, an organic LED (OLED), an active-matrix OLED (AMOLED), or the like. In some cases, the display 315 and an I/O controller (e.g., I/O controller 610) may be or represent aspects of a same component (e.g., a touchscreen) of the device 305. The display 315 may be any suitable display or screen allowing for user interaction and/or allowing for presentation of information (such as captured images and video) for viewing by a user. In some aspects, the display 315 may be a touch-sensitive display. In some cases, the display 315 may display images captured by sensors, where the displayed images that are captured by sensors may depend on the configuration of light sources and active sensors by the distortion correction manager 320.

The distortion correction manager 320, the sensor 310, the display 315, or various combinations thereof or various components thereof may be examples of means for performing various aspects of head wearable display devices as described herein. For example, the distortion correction manager 320, the sensor 310, the display 315, or various combinations or components thereof may support a method for performing one or more of the functions described herein.

In some examples, the distortion correction manager 320, the sensor 310, the display 315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the distortion correction manager 320, the sensor 310, the display 315, or various combinations or components thereof may be implemented in code (e.g., as communications management software or firmware) executed by a processor. If implemented in code executed by a processor, the functions of the distortion correction manager 320, the sensor 310, the display 315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the distortion correction manager 320 may be configured to perform various operations (e.g., receiving, monitoring, transmitting) using or otherwise in cooperation with the sensor 310, the display 315, or both. For example, the distortion correction manager 320 may receive information from the sensor 310, send information to the display 315, or be integrated in combination with the sensor 310, the display 315, or both to receive information, transmit information, or perform various other operations as described herein.

The distortion correction manager 320 may support distortion correction at the device 405 in accordance with examples as disclosed herein. For example, the distortion correction manager 320 may be configured as or otherwise support a means for capturing a set of images over a set of orientations using a set of cameras of the device, the set of images including a first subset of images captured by a first camera of the set of cameras and a second subset of images captured by a second camera of the set of cameras. The distortion correction manager 320 may be configured as or otherwise support a means for detecting a set of facial features in each of the first subset of images and the second subset of images.

The distortion correction manager 320 may be configured as or otherwise support a means for measuring a set of inter-pupillary distances over the set of orientations based on the set of facial features in each of the first subset of images and the second subset of images. The distortion correction manager 320 may be configured as or otherwise support a means for determining an inter-pupillary distance parameter for the device based on aggregating the set of inter-pupillary distances over the set of orientations. The distortion correction manager 320 may be configured as or otherwise support a means for calibrating the device based on the inter-pupillary distance parameter.

By including or configuring the distortion correction manager 320 in accordance with examples as described herein, the device 305 (e.g., a processor controlling or otherwise coupled to the sensor 310, the display 315, the distortion correction manager 320, or a combination thereof) may support techniques for reduced processing, reduced power consumption, more efficient utilization of device resources.

Figure 4:
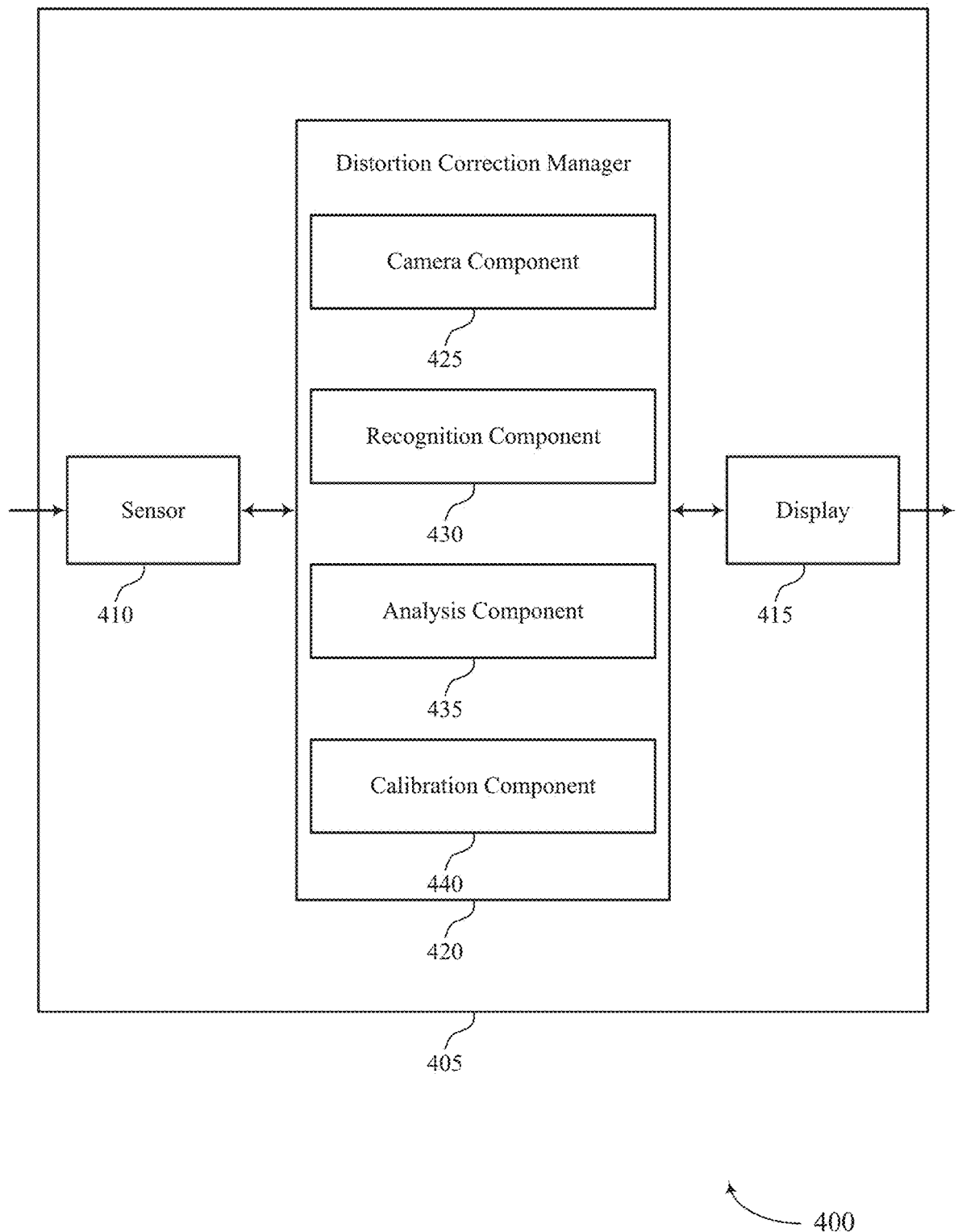

FIG. 4 shows a block diagram 400 of a device 405 that supports head wearable display devices in accordance with aspects of the present disclosure. The device 405 may be an example of aspects of a device 305 or a device 105 as described herein. The device 405 may include a sensor 410, a display 415, and a distortion correction manager 420. The device 405 may also include a processor. Each of these components may be in communication with one another (e.g., via one or more buses).

The one or more sensors 410 (e.g., image sensors, cameras, etc.) may receive information (e.g., light, for example, visible light and/or invisible light), which may be passed on to other components of the device 405. In some cases, the sensors 410 may be an example of aspects of the I/O controller 610 described with reference to FIG. 6. A sensor 410 may utilize one or more photosensitive elements that have a sensitivity to a spectrum of electromagnetic radiation to receive information (e.g., a sensor 410 may be configured or tuned to receive a pixel intensity value, red green blue (RGB) values, infrared (IR) light values, near-IR light values, ultraviolet (UV) light values of a pixel, etc.). The information may then be passed on to other components of the device 405.

Display 415 may display content generated by other components of the device. The display 415 may be an example of display 635 as described with reference to FIG. 6. In some examples, display 635 may be connected with a display buffer which stores rendered data until an image is ready to be displayed (e.g., as described with reference to FIG. 6). The display 415 may illuminate according to signals or information generated by other components of the device 405. For example, the display 415 may receive display information (e.g., pixel mappings, display adjustments) from sensor 410, and may illuminate accordingly.

The display 415 may represent a unit capable of displaying video, images, text or any other type of data for consumption by a viewer. The display 415 may include an LCD, a LED display, an OLED, an AMOLED, or the like. In some cases, the display 415 and an I/O controller (e.g., I/O controller 610) may be or represent aspects of a same component (e.g., a touchscreen) of device 405. The display 415 may be any suitable display or screen allowing for user interaction and/or allowing for presentation of information (such as captured images and video) for viewing by a user. In some aspects, the display 415 may be a touch-sensitive display. In some cases, the display 415 may display images captured by sensors, where the displayed images that are captured by sensors may depend on the configuration of light sources and active sensors by the distortion correction manager 420.

The device 405, or various components thereof, may be an example of means for performing various aspects of distortion correction as described herein. For example, the distortion correction manager 420 may include a camera component 425, a recognition component 430, an analysis component 435, a calibration component 440, or any combination thereof. The distortion correction manager 420 may be an example of aspects of a distortion correction manager 320 as described herein. In some examples, the distortion correction manager 420, or various components thereof, may be configured to perform various operations (e.g., receiving, monitoring, transmitting) using or otherwise in cooperation with the sensor 410, the display 415, or both. For example, the distortion correction manager 420 may receive information from the sensor 410, send information to the display 415, or be integrated in combination with the sensor 410, the display 415, or both to receive information, transmit information, or perform various other operations as described herein.

The distortion correction manager 420 may support distortion correction at a device in accordance with examples as disclosed herein. The camera component 425 may be configured as or otherwise support a means for capturing a set of images over a set of orientations using a set of cameras of the device, the set of images including a first subset of images captured by a first camera of the set of cameras and a second subset of images captured by a second camera of the set of cameras. The recognition component 430 may be configured as or otherwise support a means for detecting a set of facial features in each of the first subset of images and the second subset of images. The analysis component 435 may be configured as or otherwise support a means for measuring a set of inter-pupillary distances over the set of orientations based on the set of facial features in each of the first subset of images and the second subset of images. The analysis component 435 may be configured as or otherwise support a means for determining an inter-pupillary distance parameter for the device based on aggregating the set of inter-pupillary distances over the set of orientations. The calibration component 440 may be configured as or otherwise support a means for calibrating the device based on the inter-pupillary distance parameter.

Figure 5:
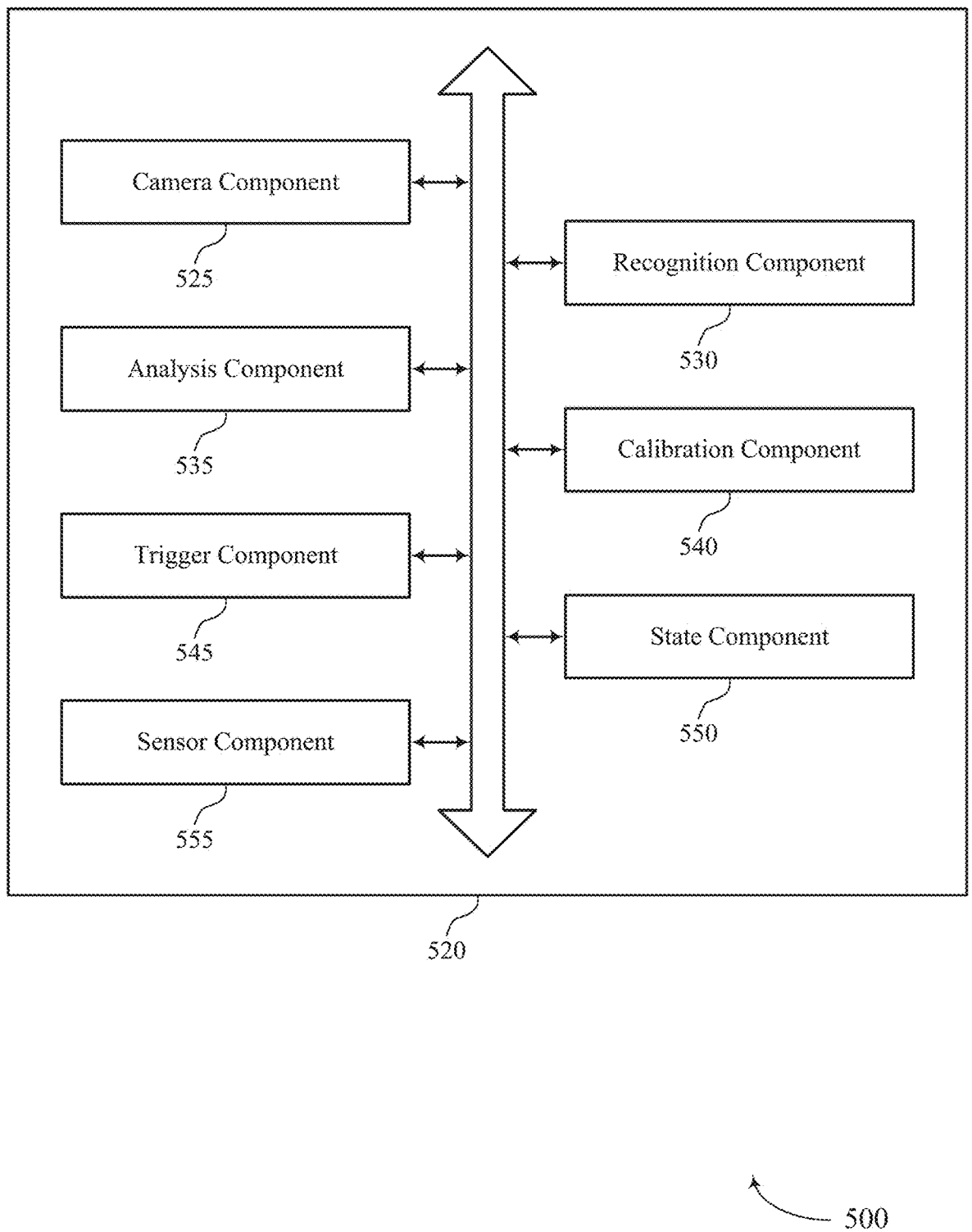
FIG. 5 shows a block diagram of a distortion correction manager that supports head wearable display devices in accordance with aspects of the present disclosure.

FIG. 5 shows a block diagram 500 of a distortion correction manager 520 that supports head wearable display devices in accordance with aspects of the present disclosure. The distortion correction manager 520 may be an example of aspects of a distortion correction manager 320, a distortion correction manager 420, or both, as described herein. The distortion correction manager 520, or various components thereof, may be an example of means for performing various aspects of distortion correction as described herein. For example, the distortion correction manager 520 may include a camera component 525, a recognition component 530, an analysis component 535, a calibration component 540, a trigger component 545, a state component 550, a sensor component 555, or any combination thereof. Each of these components may communicate, directly or indirectly, with one another (e.g., via one or more buses).

The distortion correction manager 520 may support distortion correction at a device in accordance with examples as disclosed herein. The camera component 525 may be configured as or otherwise support a means for capturing a set of images over a set of orientations using a set of cameras of the device, the set of images including a first subset of images captured by a first camera of the set of cameras and a second subset of images captured by a second camera of the set of cameras. The recognition component 530 may be configured as or otherwise support a means for detecting a set of facial features in each of the first subset of images and the second subset of images. The analysis component 535 may be configured as or otherwise support a means for measuring a set of inter-pupillary distances over the set of orientations based on the set of facial features in each of the first subset of images and the second subset of images. In some examples, the analysis component 535 may be configured as or otherwise support a means for determining an inter-pupillary distance parameter for the device based on aggregating the set of inter-pupillary distances over the set of orientations. The calibration component 540 may be configured as or otherwise support a means for calibrating the device based on the inter-pupillary distance parameter.

In some examples, the trigger component 545 may be configured as or otherwise support a means for determining a condition to perform an inter-pupillary measurement at the device. In some examples, the state component 550 may be configured as or otherwise support a means for enabling an inter-pupillary measurement state for the device based on the condition, where measuring the set of inter-pupillary distances is based on the enabling of the inter-pupillary measurement state. In some examples, the trigger component 545 may be configured as or otherwise support a means for receiving a request from the device, where determining the condition to perform the inter-pupillary measurement at the device is based on the receiving of the request from the device.

The sensor component 555 may be configured as or otherwise support a means for detecting one or more signals based on one or more sensors of the device. In some examples, the sensor component 555 may be configured as or otherwise support a means for analyzing the one or more signals using one or more learning models to identify the request to perform the inter-pupillary measurement. In some examples, the trigger component 545 may be configured as or otherwise support a means for where determining the condition to perform the inter-pupillary measurement at the device is based on the analyzing of the one or more signals using the one or more learning models to identify the request to perform the inter-pupillary measurement. In some examples, the one or more signals include one or more audio signals (e.g., voice input) associated with a user of the device, or one or more gestures associated with the user of the device, or both. In some examples, the one or more learning models include an audio recognition model or a gesture recognition model, or both.

The analysis component 535 may be configured as or otherwise support a means for determining a distortion correction parameter based on measuring the set of inter-pupillary distances, where the calibrating of the device is based on the distortion correction parameter. In some examples, the set of images further include a third subset of images captured by the first camera and a fourth subset of images captured by the second camera. In some examples, the analysis component 535 may be configured as or otherwise support a means for determining an absence of the set of facial features in each of the third subset of images and the fourth subset of images. In some examples, the analysis component 535 may be configured as or otherwise support a means for refraining from remeasuring of the set of inter-pupillary distances based on the determining of the absence of the set of facial features in each of the third subset of images and the fourth subset of images.

In some examples, the analysis component 535 may be configured as or otherwise support a means for determining an absence of the set of facial features in each of the third subset of images and the fourth subset of images. In some examples, the analysis component 535 may be configured as or otherwise support a means for refraining from redetermining the inter-pupillary distance parameter based on the determining of the absence of the set of facial features in each of the third subset of images and the fourth subset of images. In some examples, the analysis component 535 may be configured as or otherwise support a means for determining of an absence of the set of facial features in each of the third subset of images and the fourth subset of images. In some examples, the analysis component 535 may be configured as or otherwise support a means for ignoring the third subset of images or the fourth subset of images, or both, based on the determining of the absence of the set of facial features in each of the third subset of images and the fourth subset of images.

In some examples, the set of facial features including a set of irises. In some examples, the analysis component 535 may be configured as or otherwise support a means for determining a stereo match between a first iris of the set of irises and a second iris of the set of irises based on the detecting of the set of facial features, where the stereo match includes a sub-pixel stereo match. In some examples, the analysis component 535 may be configured as or otherwise support a means for determining a stereo baseline associated with the set of irises based on the detecting of the set of facial features, where the determining of the stereo match is based on the stereo baseline. In some examples, the set of cameras are each positioned on an outward facing surface of the device. In some examples, the set of cameras includes a set of eye tracking cameras, a set of RGB cameras, a set of IR cameras, or a set of ToF sensors, or a combination thereof. In some examples, calibrating the device is based on one or more user profiles.

Figure 6:
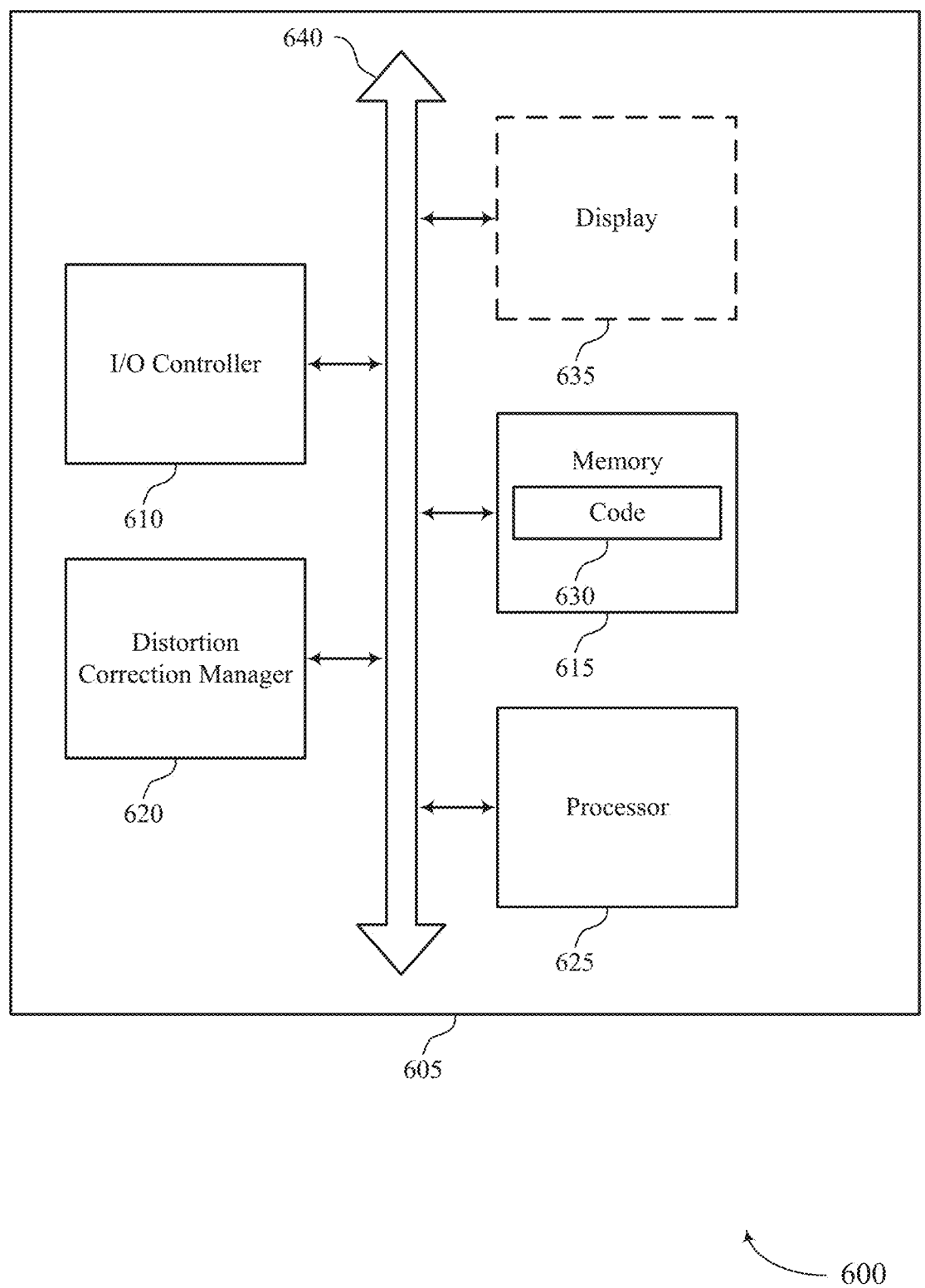
FIG. 6 shows a diagram of a system including a device that supports head wearable display devices in accordance with aspects of the present disclosure.

FIG. 6 shows a diagram of a system 600 including a device 605 that supports head wearable display devices in accordance with aspects of the present disclosure. The device 605 may be an example of or include the components of a device 305, a device 405, or a device 105 as described herein. The device 605 may include components for bi-directional voice and data communications including components for transmitting and receiving communications, such as a distortion correction manager 620, an I/O controller 610, a memory 615, and a processor 625. These components may be in electronic communication or otherwise coupled (e.g., operatively, communicatively, functionally, electronically, electrically) via one or more buses (e.g., a bus 640).

The I/O controller 610 may manage input and output signals for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In some other cases, the I/O controller 610 may represent or interact with a modem, a keyboard, a mouse, a touchscreen, or a similar device. In some cases, the I/O controller 610 may be implemented as part of a processor, such as the processor 625. In some cases, a user may interact with the device 605 via the I/O controller 610 or via hardware components controlled by the I/O controller 610.

The memory 615 may include RAM and ROM. The memory 615 may store computer-readable, computer-executable code 630 including instructions that, when executed by the processor 625, cause the device 605 to perform various functions described herein. The code 630 may be stored in a non-transitory computer-readable medium such as system memory or other type of memory. In some cases, the code 630 may not be directly executable by the processor 625 but may cause a computer (e.g., when compiled and executed) to perform functions described herein. In some cases, the memory 615 may contain, among other things, a BIOS which may control basic hardware or software operation such as the interaction with peripheral components or devices.

The processor 625 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 625 may be configured to operate a memory array using a memory controller. In some other cases, a memory controller may be integrated into the processor 625. The processor 625 may be configured to execute computer-readable instructions stored in a memory (e.g., the memory 615) to cause the device 605 to perform various functions (e.g., functions or tasks supporting head wearable display devices). For example, the device 605 or a component of the device 605 may include a processor 625 and memory 615 coupled to the processor 625, the processor 625 and memory 615 configured to perform various functions described herein.

The distortion correction manager 620 may support distortion correction at a device in accordance with examples as disclosed herein. For example, the distortion correction manager 620 may be configured as or otherwise support a means for capturing a set of images over a set of orientations using a set of cameras of the device, the set of images including a first subset of images captured by a first camera of the set of cameras and a second subset of images captured by a second camera of the set of cameras. The distortion correction manager 620 may be configured as or otherwise support a means for detecting a set of facial features in each of the first subset of images and the second subset of images.

The distortion correction manager 620 may be configured as or otherwise support a means for measuring a set of inter-pupillary distances over the set of orientations based on the set of facial features in each of the first subset of images and the second subset of images. The distortion correction manager 620 may be configured as or otherwise support a means for determining an inter-pupillary distance parameter for the device based on aggregating the set of inter-pupillary distances over the set of orientations. The distortion correction manager 620 may be configured as or otherwise support a means for calibrating the device based on the inter-pupillary distance parameter.

By including or configuring the distortion correction manager 620 in accordance with examples as described herein, the device 605 may support techniques for reduced latency, improved user experience related to reduced processing, reduced power consumption, more efficient utilization of device resources, longer battery life, among other examples.

The distortion correction manager 620, or its sub-components, may be implemented in hardware, code (e.g., software or firmware) executed by a processor, or any combination thereof. If implemented in code executed by a processor, the functions of the distortion correction manager 620, or its sub-components may be executed by a general-purpose processor, a DSP, an ASIC, a field programmable gate array (FPGA) or other programmable logic device, discrete gate or transistor logic, discrete hardware components, or any combination thereof designed to perform the functions described in the present disclosure. The distortion correction manager 620, or its sub-components, may be physically located at various positions, including being distributed such that portions of functions are implemented at different physical locations by one or more physical components. In some examples, the distortion correction manager 620, or its sub-components, may be a separate and distinct component in accordance with various aspects of the present disclosure. In some examples, the distortion correction manager 620, or its sub-components, may be combined with one or more other hardware components, including but not limited to an I/O component, a camera controller, another computing device, one or more other components described in the present disclosure, or a combination thereof in accordance with various aspects of the present disclosure.

Figure 7:
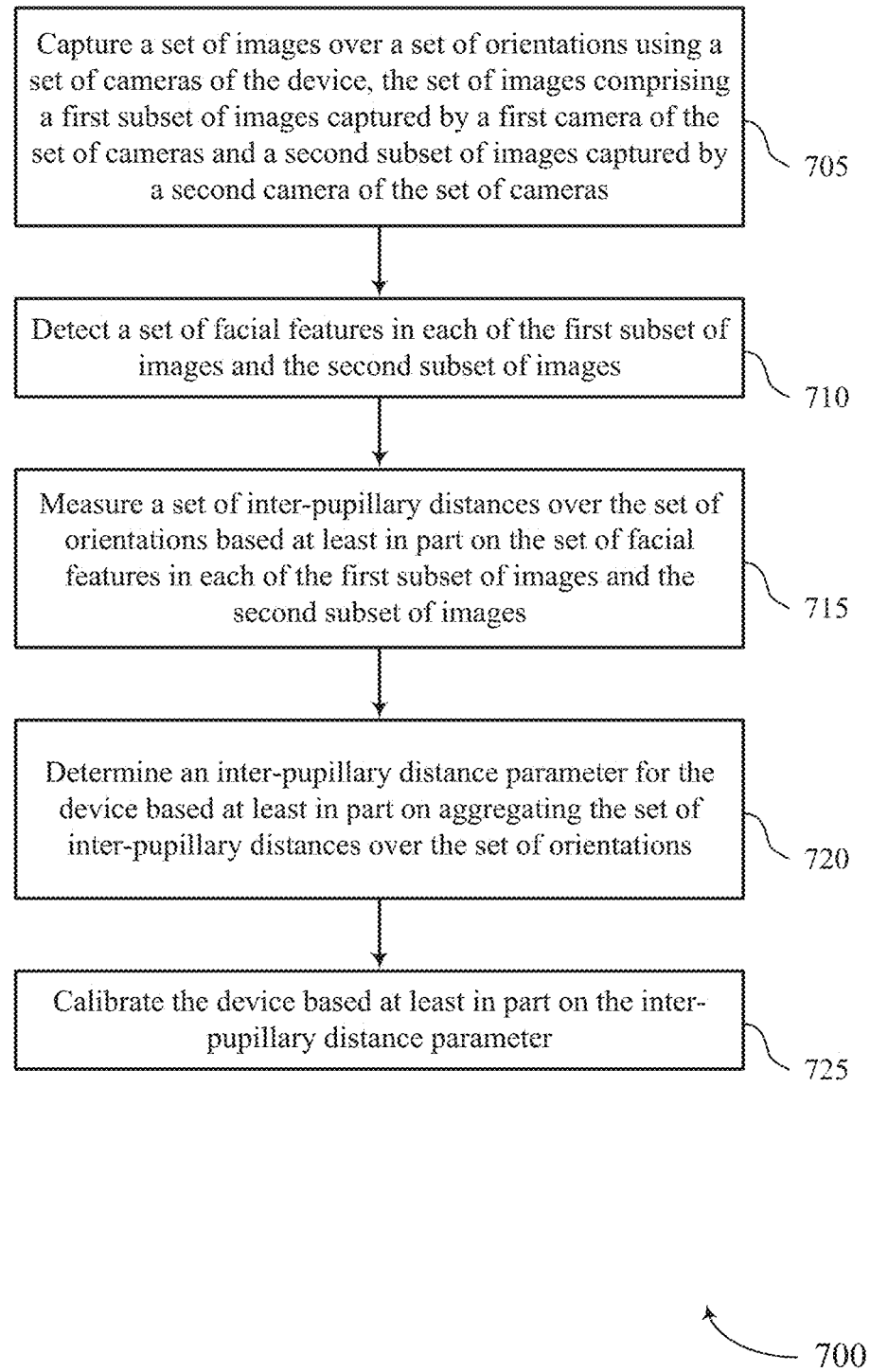
FIGS. 7 through 9 show flowcharts illustrating methods that support head wearable display devices in accordance with aspects of the present disclosure.

FIG. 7 shows a flowchart illustrating a method 700 that supports head wearable display devices in accordance with aspects of the present disclosure. The operations of the method 700 may be implemented by a device or its components as described herein. For example, the operations of the method 700 may be performed by a device as described with reference to FIGS. 1 through 6. In some examples, a device may execute a set of instructions to control the functional elements of the device to perform the described functions. Additionally or alternatively, the device may perform aspects of the described functions using special-purpose hardware.

At 705, the method may include capturing a set of images over a set of orientations using a set of cameras of the device, the set of images including a first subset of images captured by a first camera of the set of cameras and a second subset of images captured by a second camera of the set of cameras. The operations of 705 may be performed in accordance with examples as disclosed herein. In some examples, aspects of the operations of 705 may be performed by a camera component 525 as described with reference to FIG. 5.

At 710, the method may include detecting a set of facial features in each of the first subset of images and the second subset of images. The operations of 710 may be performed in accordance with examples as disclosed herein. In some examples, aspects of the operations of 710 may be performed by a recognition component 530 as described with reference to FIG. 5.

At 715, the method may include measuring a set of inter-pupillary distances over the set of orientations based on the set of facial features in each of the first subset of images and the second subset of images. The operations of 715 may be performed in accordance with examples as disclosed herein. In some examples, aspects of the operations of 715 may be performed by an analysis component 535 as described with reference to FIG. 5.

At 720, the method may include determining an inter-pupillary distance parameter for the device based on aggregating the set of inter-pupillary distances over the set of orientations. The operations of 720 may be performed in accordance with examples as disclosed herein. In some examples, aspects of the operations of 720 may be performed by an analysis component 535 as described with reference to FIG. 5.

At 725, the method may include calibrating the device based on the inter-pupillary distance parameter. The operations of 725 may be performed in accordance with examples as disclosed herein. In some examples, aspects of the operations of 725 may be performed by a calibration component 540 as described with reference to FIG. 5.

Figure 8:
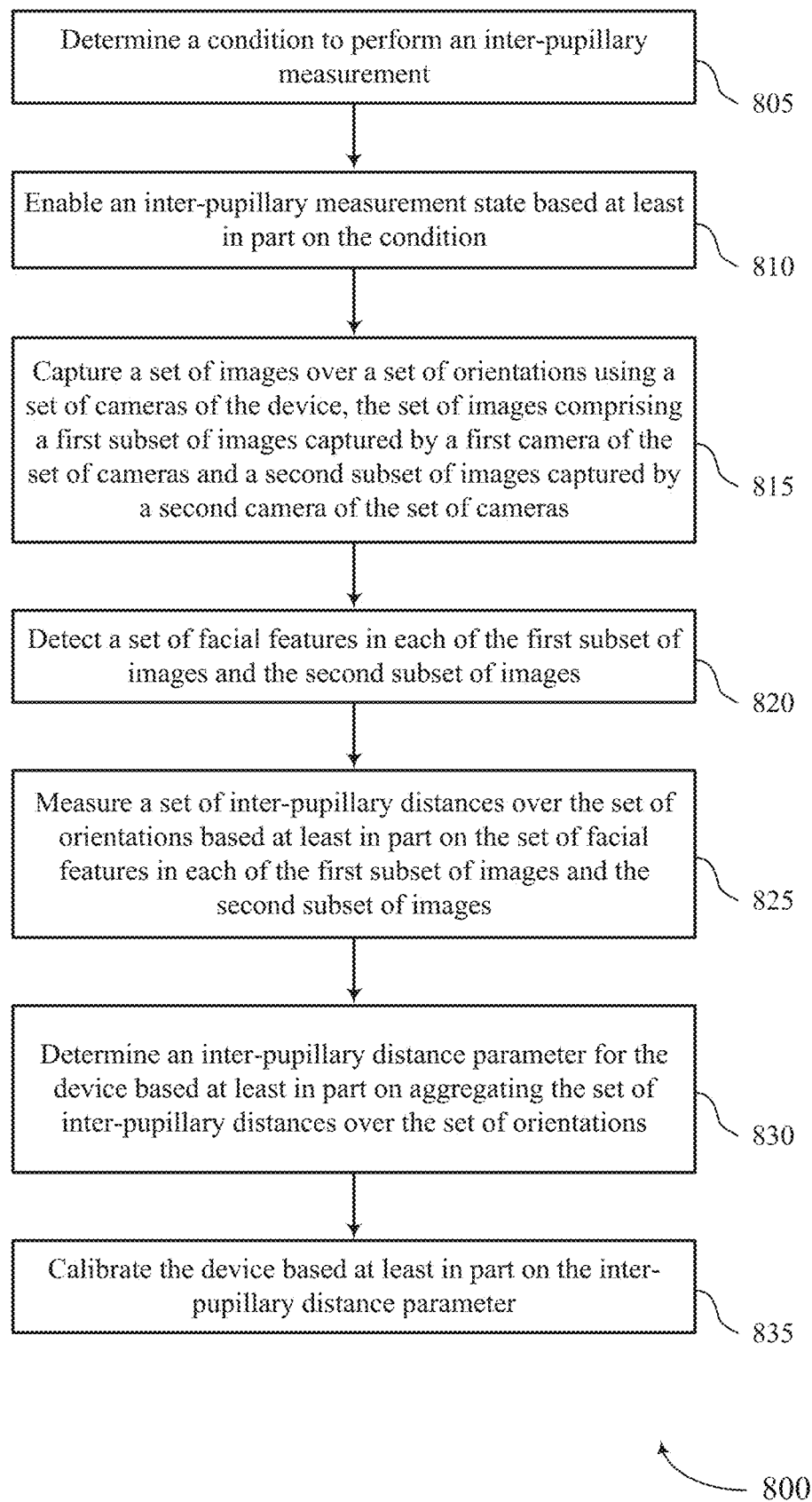

FIG. 8 shows a flowchart illustrating a method 800 that supports head wearable display devices in accordance with aspects of the present disclosure. The operations of the method 800 may be implemented by a device or its components as described herein. For example, the operations of the method 800 may be performed by a device as described with reference to FIGS. 1 through 6. In some examples, a device may execute a set of instructions to control the functional elements of the device to perform the described functions. Additionally or alternatively, the device may perform aspects of the described functions using special-purpose hardware.

At 805, the method may include determining a condition to perform an inter-pupillary measurement. The operations of 805 may be performed in accordance with examples as disclosed herein. In some examples, aspects of the operations of 805 may be performed by a trigger component 545 as described with reference to FIG. 5.

At 810, the method may include enabling an inter-pupillary measurement state based on the condition. The operations of 810 may be performed in accordance with examples as disclosed herein. In some examples, aspects of the operations of 810 may be performed by a state component 550 as described with reference to FIG. 5.

At 815, the method may include capturing a set of images over a set of orientations using a set of cameras of the device, the set of images including a first subset of images captured by a first camera of the set of cameras and a second subset of images captured by a second camera of the set of cameras. The operations of 815 may be performed in accordance with examples as disclosed herein. In some examples, aspects of the operations of 815 may be performed by a camera component 525 as described with reference to FIG. 5.

At 820, the method may include detecting a set of facial features in each of the first subset of images and the second subset of images. The operations of 820 may be performed in accordance with examples as disclosed herein. In some examples, aspects of the operations of 820 may be performed by a recognition component 530 as described with reference to FIG. 5.

At 825, the method may include measuring a set of inter-pupillary distances over the set of orientations based on the set of facial features in each of the first subset of images and the second subset of images. The operations of 825 may be performed in accordance with examples as disclosed herein. In some examples, aspects of the operations of 825 may be performed by an analysis component 535 as described with reference to FIG. 5.

At 830, the method may include determining an inter-pupillary distance parameter for the device based on aggregating the set of inter-pupillary distances over the set of orientations. The operations of 830 may be performed in accordance with examples as disclosed herein. In some examples, aspects of the operations of 830 may be performed by an analysis component 535 as described with reference to FIG. 5.

At 835, the method may include calibrating the device based on the inter-pupillary distance parameter. The operations of 835 may be performed in accordance with examples as disclosed herein. In some examples, aspects of the operations of 835 may be performed by a calibration component 540 as described with reference to FIG. 5.

Figure 9:
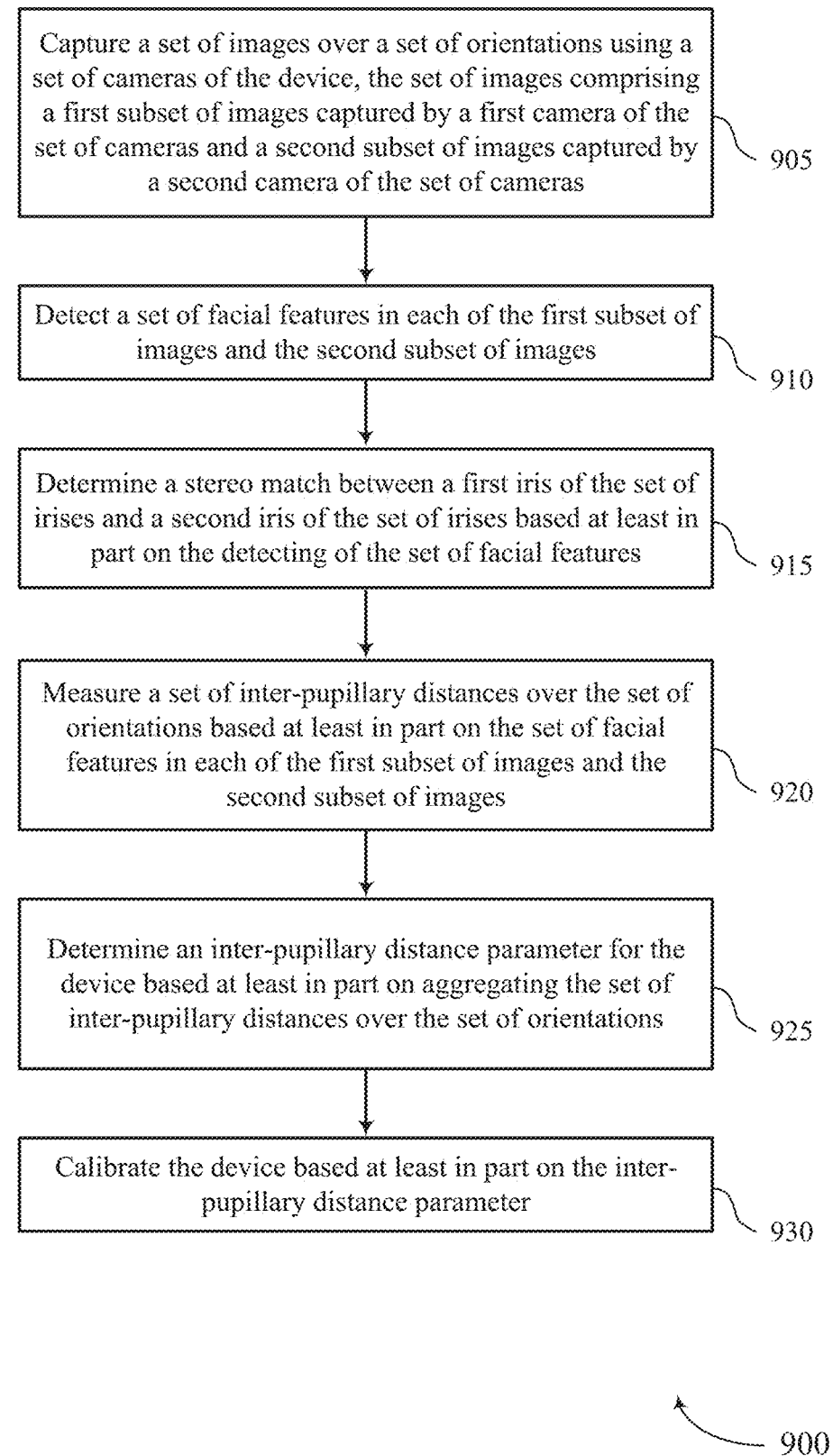

FIG. 9 shows a flowchart illustrating a method 900 that supports head wearable display devices in accordance with aspects of the present disclosure. The operations of the method 900 may be implemented by a device or its components as described herein. For example, the operations of the method 900 may be performed by a device as described with reference to FIGS. 1 through 6. In some examples, a device may execute a set of instructions to control the functional elements of the device to perform the described functions. Additionally or alternatively, the device may perform aspects of the described functions using special-purpose hardware.

At 905, the method may include capturing a set of images over a set of orientations using a set of cameras of the device, the set of images including a first subset of images captured by a first camera of the set of cameras and a second subset of images captured by a second camera of the set of cameras. The operations of 905 may be performed in accordance with examples as disclosed herein. In some examples, aspects of the operations of 905 may be performed by a camera component 525 as described with reference to FIG. 5.

At 910, the method may include detecting a set of facial features in each of the first subset of images and the second subset of images. The operations of 910 may be performed in accordance with examples as disclosed herein. In some examples, aspects of the operations of 910 may be performed by a recognition component 530 as described with reference to FIG. 5.

At 915, the method may include determining a stereo match between a first iris of the set of irises and a second iris of the set of irises based on the detecting of the set of facial features. The stereo match may include a sub-pixel stereo match. The operations of 915 may be performed in accordance with examples as disclosed herein. In some examples, aspects of the operations of 915 may be performed by an analysis component 535 as described with reference to FIG. 5.

At 920, the method may include measuring a set of inter-pupillary distances over the set of orientations based on the set of facial features in each of the first subset of images and the second subset of images. The operations of 920 may be performed in accordance with examples as disclosed herein. In some examples, aspects of the operations of 920 may be performed by an analysis component 535 as described with reference to FIG. 5.

At 925, the method may include determining an inter-pupillary distance parameter for the device based on aggregating the set of inter-pupillary distances over the set of orientations. The operations of 925 may be performed in accordance with examples as disclosed herein. In some examples, aspects of the operations of 925 may be performed by an analysis component 535 as described with reference to FIG. 5.

At 930, the method may include calibrating the device based on the inter-pupillary distance parameter. The operations of 930 may be performed in accordance with examples as disclosed herein. In some examples, aspects of the operations of 930 may be performed by a calibration component 540 as described with reference to FIG. 5.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for distortion correction at a device, comprising: capturing a set of images over a set of orientations using a set of cameras of the device, the set of images comprising a first subset of images captured by a first camera of the set of cameras and a second subset of images captured by a second camera of the set of cameras: detecting a set of facial features in each of the first subset of images and the second subset of images; measuring a set of inter-pupillary distances over the set of orientations based at least in part on the set of facial features in each of the first subset of images and the second subset of images: determining an inter-pupillary distance parameter for the device based at least in part on aggregating the set of inter-pupillary distances over the set of orientations; and calibrating the device based at least in part on the inter-pupillary distance parameter.

Aspect 2: The method of aspect 1, further comprising: determining a condition to perform an inter-pupillary measurement at the device; and enabling an inter-pupillary measurement state for the device based at least in part on the condition, wherein measuring the set of inter-pupillary distances is based at least in part on the enabling of the inter-pupillary measurement state.

Aspect 3: The method of aspect 2, further comprising: receiving a request from the device, wherein determining the condition to perform the inter-pupillary measurement at the device is based at least in part on the receiving of the request from the device.

Aspect 4: The method of aspect 3, further comprising: detecting one or more signals based at least in part on one or more sensors of the device; and analyzing the one or more signals using one or more learning models to identify the request to perform the inter-pupillary measurement, wherein determining the condition to perform the inter-pupillary measurement at the device is based at least in part on the analyzing of the one or more signals using the one or more learning models to identify the request to perform the inter-pupillary measurement.

Aspect 5: The method of aspect 4, wherein the one or more signals comprise one or more audio signals associated with a user of the device, or one or more gestures associated with the user of the device, or both; and the one or more learning models comprise an audio recognition model or a gesture recognition model, or both.

Aspect 6: The method of any of aspects 1 through 5, further comprising: determining a distortion correction parameter based at least in part on measuring the set of inter-pupillary distances, wherein the calibrating of the device is based at least in part on the distortion correction parameter.

Aspect 7: The method of any of aspects 1 through 6, wherein the set of images further comprise a third subset of images captured by the first camera and a fourth subset of images captured by the second camera.

Aspect 8: The method of aspect 7, further comprising: determining an absence of the set of facial features in each of the third subset of images and the fourth subset of images; and refraining from remeasuring of the set of inter-pupillary distances based at least in part on the determining of the absence of the set of facial features in each of the third subset of images and the fourth subset of images.

Aspect 9: The method of any of aspects 7 through 8, further comprising: determining an absence of the set of facial features in each of the third subset of images and the fourth subset of images; and refraining from redetermining the inter-pupillary distance parameter based at least in part on the determining of the absence of the set of facial features in each of the third subset of images and the fourth subset of images.

Aspect 10: The method of any of aspects 7 through 9, further comprising: determining of an absence of the set of facial features in each of the third subset of images and the fourth subset of images; and ignoring the third subset of images or the fourth subset of images, or both, based at least in part on the determining of the absence of the set of facial features in each of the third subset of images and the fourth subset of images.

Aspect 11: The method of any of aspects 1 through 10, wherein the set of facial features comprising a set of irises.

Aspect 12: The method of aspect 11, further comprising: determining a stereo match between a first iris of the set of irises and a second iris of the set of irises based at least in part on the detecting of the set of facial features, wherein the stereo match comprises a sub-pixel stereo match.

Aspect 13: The method of aspect 12, further comprising: determining a stereo baseline associated with the set of irises based at least in part on the detecting of the set of facial features, wherein the determining of the stereo match is based at least in part on the stereo baseline.

Aspect 14: The method of any of aspects 1 through 13, wherein the set of cameras are each positioned on an outward facing surface of the device.

Aspect 15: The method of any of aspects 1 through 14, wherein the set of cameras comprises a set of eye tracking cameras, a set of RGB cameras, a set of IR cameras, or a set of ToF sensors, or a combination thereof.

Aspect 16: The method of any of aspects 1 through 15, wherein calibrating the device is based at least in part on one or more user profiles.

Aspect 17: An apparatus for distortion correction, comprising a processor; memory coupled with the processor; and instructions stored in the memory and executable by the processor to cause the apparatus to perform a method of any of aspects 1 through 16.

Aspect 18: An apparatus for distortion correction, comprising at least one means for performing a method of any of aspects 1 through 16.

Aspect 19: A non-transitory computer-readable medium storing code for distortion correction at a device, the code comprising instructions executable by a processor to perform a method of any of aspects 1 through 16.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for distortion correction at a device, comprising:
    capturing a set of images over a set of orientations using a set of cameras of the device, the set of images comprising a first subset of images captured by a first camera of the set of cameras and a second subset of images captured by a second camera of the set of cameras, wherein the set of images further comprise a third subset of images captured by the first camera and a fourth subset of images captured by the second camera;
    detecting a set of facial features in each of the first subset of images and the second subset of images;
    measuring a set of inter-pupillary distances over the set of orientations based at least in part on the set of facial features in each of the first subset of images and the second subset of images;
    determining an inter-pupillary distance parameter for the device based at least in part on aggregating the set of inter-pupillary distances over the set of orientations; and
    calibrating the device based at least in part on the inter-pupillary distance parameter.

2. The method of claim 1, further comprising:
    determining a condition to perform an inter-pupillary measurement at the device; and
    enabling an inter-pupillary measurement state for the device based at least in part on the condition, wherein measuring the set of inter-pupillary distances is based at least in part on the enabling of the inter-pupillary measurement state.

3. The method of claim 2, further comprising:
    receiving a request from the device, wherein determining the condition to perform the inter-pupillary measurement at the device is based at least in part on the receiving of the request from the device.

4. The method of claim 3, further comprising:
    detecting one or more signals based at least in part on one or more sensors of the device; and
    analyzing the one or more signals using one or more learning models to identify the request to perform the inter-pupillary measurement,
    wherein determining the condition to perform the inter-pupillary measurement at the device is based at least in part on the analyzing of the one or more signals using the one or more learning models to identify the request to perform the inter-pupillary measurement.

5. The method of claim 4, wherein:
    the one or more signals comprise one or more audio signals associated with a user of the device, or one or more gestures associated with the user of the device, or both; and
    the one or more learning models comprise an audio recognition model or a gesture recognition model, or both.

6. The method of claim 1, further comprising:
    determining a distortion correction parameter based at least in part on measuring the set of inter-pupillary distances, wherein the calibrating of the device is based at least in part on the distortion correction parameter.

7. The method of claim 1, further comprising:
    determining an absence of the set of facial features in each of the third subset of images and the fourth subset of images; and
    refraining from remeasuring of the set of inter-pupillary distances based at least in part on the determining of the absence of the set of facial features in each of the third subset of images and the fourth subset of images.

8. The method of claim 1, further comprising:
    determining an absence of the set of facial features in each of the third subset of images and the fourth subset of images; and
    refraining from redetermining the inter-pupillary distance parameter based at least in part on the determining of the absence of the set of facial features in each of the third subset of images and the fourth subset of images.

9. The method of claim 1, further comprising:
    determining of an absence of the set of facial features in each of the third subset of images and the fourth subset of images; and ignoring the third subset of images or the fourth subset of images, or both, based at least in part on the determining of the absence of the set of facial features in each of the third subset of images and the fourth subset of images.

10. The method of claim 1, wherein the set of facial features comprising a set of irises.

11. The method of claim 10, further comprising:
determining a stereo match between a first iris of the set of irises and a second iris of the set of irises based at least in part on the detecting of the set of facial features, wherein the stereo match comprises a sub-pixel stereo match.

12. The method of claim 11, further comprising:
determining a stereo baseline associated with the set of irises based at least in part on the detecting of the set of facial features, wherein the determining of the stereo match is based at least in part on the stereo baseline.

13. The method of claim 1, wherein the set of cameras are each positioned on an outward facing surface of the device.

14. The method of claim 1, wherein the set of cameras comprises a set of eye tracking cameras, a set of red-green-blue cameras, a set of infrared cameras, or a set of time-of-flight sensors, or a combination thereof.

15. The method of claim 1, wherein calibrating the device is based at least in part on one or more user profiles.

16. An apparatus for distortion correction, comprising:
a processor;
memory coupled with the processor; and
instructions stored in the memory and executable by the processor to cause the apparatus to:
capture a set of images over a set of orientations using a set of cameras of the apparatus, the set of images comprising a first subset of images captured by a first camera of the set of cameras and a second subset of images captured by a second camera of the set of cameras, wherein the set of images further comprise a third subset of images captured by the first camera and a fourth subset of images captured by the second camera;
detect a set of facial features in each of the first subset of images and the second subset of images;
measure a set of inter-pupillary distances over the set of orientations based at least in part on the set of facial features in each of the first subset of images and the second subset of images;
determine an inter-pupillary distance parameter for the apparatus based at least in part on aggregating the set of inter-pupillary distances over the set of orientations; and
calibrate the apparatus based at least in part on the inter-pupillary distance parameter.

17. The apparatus of claim 16, wherein the apparatus comprises a pair of augmented reality glasses and the set of cameras are positioned on an outward side of the pair of augmented reality glasses.

18. The apparatus of claim 16, wherein the instructions are further executable by the processor to cause the apparatus to:
detect one or more signals based at least in part on one or more sensors of the apparatus;
analyze the one or more signals using one or more learning models to identify a request to perform the inter-pupillary measurement; and
determine a condition to perform the inter-pupillary measurement at the apparatus based at least in part on the analyzing of the one or more signals using the one or more learning models to identify the request to perform the inter-pupillary measurement.

19. An apparatus for distortion correction, comprising:
means for capturing a set of images over a set of orientations using a set of cameras of the apparatus, the set of images comprising a first subset of images captured by a first camera of the set of cameras and a second subset of images captured by a second camera of the set of cameras, wherein the set of images further comprise a third subset of images captured by the first camera and a fourth subset of images captured by the second camera;
means for detecting a set of facial features in each of the first subset of images and the second subset of images;
means for measuring a set of inter-pupillary distances over the set of orientations based at least in part on the set of facial features in each of the first subset of images and the second subset of images;
means for determining an inter-pupillary distance parameter for the apparatus based at least in part on aggregating the set of inter-pupillary distances over the set of orientations; and
means for calibrating the apparatus based at least in part on the inter-pupillary distance parameter.

* * * * *